United States Patent Office 3,359,299
Patented Dec. 19, 1967

3,359,299
ARYL, ALKARYL AND ARALKYL ESTERS OF HALO-SUBSTITUTED POLYHYDRODIALKA-NONAPHTHALENEDICARBOXYLIC ACIDS AND A METHOD FOR THE PREPARATION THEREOF
Morris Dunkel, Paramus, N.J., assignor to Universal Oil Products Company, Des Plaines, Ill., a corporation of Delaware
No Drawing. Filed June 17, 1964, Ser. No. 375,939
7 Claims. (Cl. 260—468)

ABSTRACT OF THE DISCLOSURE

Aromatic esters of halo-substituted octahydro-1,4,5,8-dimethano-2,3-dicarboxylic acids, useful as plasticizers, insecticides, lubricants and/or hydraulic fluids.

---

This invention relates to novel compositions of matter comprising certain esters of halo-substituted polyhydrodialkanonaphthalenedicarboxylic acids and to a method for the preparation thereof. More particularly, the invention is concerned with mono- and dihydrocarbyl esters of chloro-substituted polyhydrodialkanonaphthalenedicarboxylic acids and to a method for preparing these compounds.

It has now been discovered that novel compositions of matter comprising mono- and dihydrocarbyl esters of halo-substituted polyhydrodialkanonaphthalenedicarboxylic acids may be prepared in a manner hereinafter set forth in greater detail. In particular, the compounds of this invention are esters of said acids and hydroxy-substituted compounds having radicals containing at least one aromatic nucleus and include aryl, alkaryl and aralkyl radicals. It is also contemplated within the scope of this invention that said radical may also contain halogen substituents, preferably chlorine and bromine. These esters will find a wide variety of uses in the chemical field. For example, mono- and dihydrocarbyl esters of the aforementioned acids may be used as plasticizers when admixed with polymers or resins. Inasmuch as the use of plastics has increased within the past years, the synthetic materials must, of necessity, possess many and varied physical properties in order to meet the specific needs for which they are intended. The use of compounds, which may be defined as "plasticizers," is important inasmuch as these compounds will modify the polymer or resin and thus impart different physical properties to the polymer or resin thereby permitting the use of a finished product in such a manner which has previously been determined. For example, one reason for including a plasticizer in a molding composition is to increase the flowability of the material thereby insuring a complete filling of the mold cavity and a perfect reproduction, particularly when the article to be formed is of a complex configuration. If an insufficient amount of a binder is used, the flow of the material may not be fast enough or an insufficient flow may be caused by the too rapid reaction of a thermo-setting binder under the heat of the mold, these drawbacks being overcome by the utilization of a plasticizer. Another advantage of using a plasticizer is to reduce the melt viscosity, lower the temperature of a second-order transition or lower the elastic modulus of the product or to impart flexibility to the finished product to prevent cracking of the polymer when said polymer is in a rigid, brittle state. In order to have a flexible polymer, the long thread-like polymer chains which are more or less randomly arranged in a thermoplastic resin system must be free to slide past each other. The plasticizers which are used form loose bonds with the polymer thereby masking the active centers of the polymer chains and reducing mechanical entanglement. The esters of the present invention contain a certain number of effective groups which are able to associate with the polymer chains and thus provide a good plasticizer. In addition, the plasticizers must have certain desirable features including the ability to remain in the end product and remain chemically unchanged during the life of the product, the permanence of the plasticizer being illustrated by a good compatibility between the plasticizer and the polymer whereby the plasticizer is prevented from being forced out of the polymer, a low volatility so that evaporation of the plasticizer is minimized, a resistance to diffusion through the polymer and a chemical stability whereby the plasticizer is resistant to destruction or degradation by outside influences, such as oxidation, ultra-violet radiation or high temperature. In addition, plasticizers should also possess the desirable qualities of being resistant to mildew, be compatible with pigments and impart flame-retardancy or non-inflammability to the finished product. The esters which are formed by the process hereinafter set forth in greater detail may be incorporated in various resins or polymers to form finished products which possess a high degree of color stability and a high degree of flame retardancy thereby permitting the use of such plastics in situations in which these physical properties are essential.

The color stability of products and particularly esters of the type prepared according to the present invention which are derived from polyhalopolyhydrodialkanonaphthalenedicarboxylic acids and anhydrides thereof compared with similar compounds would not be expected based on current theoretical reasoning. Because alkylated cyclohexanes are known to undergo autoxidation readily, it might be predicted that polyhalopolyhydrodialkanonaphthalenedicarboxylic acids and anhydrides thereof would be rapidly attacked by atmospheric oxygen and be susceptible to free radical reactions catalyzed by light. Such attack should lead initially to hydroperoxide formation at the various ring junctions as well as at the positions alpha to the carboxyl groups. Decomposition of the hydroperoxides would lead to formation of alcohols, ketones, olefins, ring opening and further attack on the susceptible methylene carbon atoms. The products of these reactions which might be aromatic compounds, quinones and condensed materials would liberate hydrogen chloride and form highly colored products. The reason that these processes fail to occur with polyhalopolyhydrodialkanonaphthalenedicarboxylic acids and anhydrides thereof has not been proven at this time.

In addition to the aforementioned properties of color stability and flame retardancy which the hydrocarbyl esters of the polyhalopolyhydrodimethanonaphthalenedicarboxylic acids possess, it has been found that the aforementioned esters are soluble to an unexpected extent in the polymers. This solubility is unexpected in view of the fact that comparable polycyclic acids or anhydrides thereof which contain halo substituents but which do not contain the same number of rings exhibit dissimilar properties, a specific example being a tricyclic polyhalopolyhydrodicarboxylic acid which is relatively soluble in certain polymers while a tetracyclic polyhalopolyhydodicarboxylic acid or anhydride thereof is less soluble. Therefore, it would be expected that the hydrocarbyl esters of a polyhalopolyhydrodimethanonaphthalenedicarboxylic acid which is hexacyclic in nature would be less soluble than either the tricyclic or tetracyclic ompounds. This unexpected solubility is an advantage in many instances inasmuch as the admixture of the hydrocarbyl esters of the polyhalopolyhydrodimethanonaphthalenedicarboxylic acid with certain polymers may be accomplished at relatively lower temperatures and pressures and with a lesser amount of a polymer utilized to prepare the desired finished product.

Examples of polymers with which the esters of the present invention may be utilized as plasticizers include the vinyl compounds such as polyvinyl chloride, polyvinyl chloride acetate, polyvinylacetate, polyvinyl butyral, etc. These polymers in their unplasticized state are hard, brittle and rigid and the addition of plasticizers of the type hereinafter set forth in greater detail will allow the finished products to be utilized in a soft, flexible state. This is of particular importance inasmuch as the polyvinyl compounds in the past years have found a great deal of use as coverings for chairs, sofas, automobile seats, etc. It is to be understood that the use of the hydrocarbyl esters of the present invention is not limited to the polymers hereinbefore set forth and that said esters may be used with other polymers wherever compatible.

In addition to the aforementioned use of these mono- and dihydrocarbyl esters of poly-substituted polyhydrodialkanonaphthalenedicarboxylic acids, the compounds may also be used as lubricants and/or hydraulic fluids if the length of the alkyl side-chain contains a sufficient number of carbon atoms or, due to the presence of the polyhalo substituents, they may be utilized per se or in conjunction with other organic compounds as insecticides, especially against houseflies.

It is therefore an object of this invention to prepare mono- and dihydrocarbyl esters of polyhalo-substituted polyhydrodialkanonaphthalenedicarboxylic acids.

A further object of this invention is to prepare novel compositions of matter comprising mono- and dihydrocarbyl esters of polychloro-substituted polyhydrodialkanonaphthalenedicarboxylic acids which are useful as plasticizers.

In a broad aspect one embodiment of this invention resides in a hydrocarbyl ester of a halo-substituted polyhydrodialkanonaphthalenedicarboxylic acid.

Another embodiment of this invention resides in a process for the preparation of a hydrocarbyl ester of a halo-substituted polyhydrodialkanonaphthalenedicarboxylic acid which comprises reacting a compound selected from the group consisting of halo-substituted polyhydrodialkanonaphthalenedicarboxylic acids and anhydrides thereof with a hydroxy-substituted hydrocarbyl compound containing at least one aromatic nucleus at reaction conditions, and recovering the resultant hydrocarbyl ester of a halo-substituted polyhydrodialkanonaphthalenedicarboxylic acid.

A further embodiment of this invention is found in a polymeric composition of matter comprising a polyvinyl compound and a hydrocarbyl ester of a halo-substituted polyhydrodialkanonaphthalenedicarboxylic acid.

A specific embodiment of this invention is found in the benzyl ester of 5,6,7,8,9,9-hexachloro-1,2,3,4,4a,5,8,8a-octahydro-1,4,5,8-dimethano - 2,3 - naphthalenedicarboxylic acid.

A further specific embodiment of this invention resides in a process for the preparation of the phenylethyl ester of 5,6,7,8,9,9-hexachloro-1,2,3,4,4a,5,8,8a-octahydro-1,4, 5,8-dimethano - 2,3 - naphthalenedicarboxylic acid which comprises reacting dimethyl 5,6,7,8,9,9-hexachloro-1,2,3, 4,4a,5,8,8a-octahydro - 1,4,5,8 - dimethano-2,3-naphthalenedicarboxylate with phenylethyl alcohol at a temperature in the range of from about 75° to about 200° C. in the presence of a catalyst, and recovering the resultant phenylethyl ester of 5,6,7,8,9,9-hexachloro-1,2,3,4,4a,5,8, 8a-octahydro-1,4,5,8-dimethano - 2,3 - naphthalenedicarboxylic acid.

Yet another specific embodiment of this invention is found in a polymeric composition of matter comprising polyvinyl chloride and the p-tert-butylphenyl ester of 5,6, 7,8,9,9-hexachloro-1,2,3,4,4a,5,8,8a - octahydro - 1,4,5,8-dimethano-2,3-naphthalenedicarboxylic acid.

As hereinbefore set forth, it has now been discovered that hydrocarbyl esters of halo-substituted polyhydrodialkanonaphthalenedicarboxylic acids may be prepared by condensing a hydroxy-substituted hydrocarbyl compound containing at least one aromatic nucleus with an acid or anhydride thereof, specific examples being hereinafter set forth in greater detail. The term "hydrocarbyl ester" as used in the present specification and appended claims will refer to both mono- and dihydrocarbyl esters of the various acids. Examples of hydroxy-substituted hydrocarbyl compounds which may be reacted with the halo-substituted polyhydrodialkanonaphthalenedicarboxylic acids or anhydrides thereof include phenol, o-methylphenol (o-cresol), m-methylphenol (m-cresol), p-methylphenol (p-cresol), o-ethylphenol, m-ethylphenol, p-ethylphenol, o-propylphenol, m-propylphenol, p-propylphenol, o-isopropylphenol, m-isopropylphenol, p-isopropylphenol, o-butylphenol, m-butylphenol, p-butylphenol, o-tert-butylphenol, m-tert-butylphenol, p-tert-butylphenol, etc.; benzyl alcohol, phenethyl alcohol, phenylpropyl alcohol, phenylbutyl alcohol, p-methylbenzyl alcohol, p-ethylbenzyl alcohol, p-propylbenzyl alcohol, p-methylphenylethyl alcohol, p-ethylphenylethyl alcohol, etc. In addition to the aforementioned hydroxy-substituted aryl, alkaryl and aralkyl compounds, it is also contemplated within the scope of this invention that the aforementioned compounds may also contain halo substituents, preferably chlorine and bromine atoms. Some specific examples of these compounds would include o-chlorophenol, o-bromophenol, m-chlorophenol, m-bromophenol, p-chlorophenol, p-bromophenol, 2,4-dichlorophenol, 2,4-dibromophenol, 4-chloro-o-cresol, 4-bromo-o-cresol, 4-chloro-m-cresol, 4-bromo-m-cresol, 2-chloro-p-cresol, 2-bromo-p-cresol, 3,4-dichloro-o-cresol, 4,6-dibromo-m-cresol, o-chlorobenzyl alcohol, o-bromobenzyl alcohol, m-chlorobenzyl alcohol, m-bromobenzyl alcohol, p-chlorobenzyl alcohol, p-bromobenzyl alcohol, o-chlorophenylethyl alcohol, o-bromophenylethyl alcohol m-chlorophenylethyl alcohol, m-bromophenylethyl alcohol, p-chlorophenylethyl alcohol, p-bromophenylethyl alcohol, 2,4-dichlorobenzyl alcohol, 2,4-dibromobenzyl alcohol, etc. It is to be understood that the aforementioned hydroxy-substituted hydrocarbyl compounds are only representatives of the class of compounds which may be used and that the present invention is not necessarily limited thereto. The above mentioned hydroxy-substituted compounds may be represented by the formula:

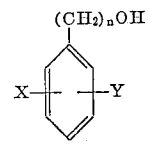

wherein X and Y are independently selected from the group consisting of hydrogen, halogen and lower alkyl and $n$ is a number of from 0 to 4.

Examples of polyhalo-substituted polyhydrodialkanonaphthalenedicarboxylic acids and anhydrides thereof which may be reacted with the aforementioned hydroxy-substituted hydrocarbyl compounds include 5,6,7,8-tetrachloro-1,2,3,4,4a,5,8,8a-octahydro - 1,4,5,8 - dimethano-2,3-naphthalenedicarboxylic acid, 5,6,7,8-tetrachloro-1,2, 3,4,4a,5,8,8a-octahydro-1,4,5,8 - dimethano - 2,3 - naphthalenedicarboxylic anhydride, 5,6,7,8-tetrabromo-1,2,3,4, 4a,5,8,8a-octahydro-1,4,5,8-dimethano - 2,3-naphthalenedicarboxylic acid, 5,6,7,8-tetrabromo-1,2,3,4,4a,5,8,8a-octahydro-1,4,5,8-dimethano - 2,3 - naphthalenedicarboxylic anhydride, 5,6,7,8,9,9-hexachloro-1,2,3,4,4a,5,8,8a-octahydro-1,4,5,8-dimethano-2,3 - naphthalenedicarboxylic acid, 5,6,7,8,9,9-hexachloro-1,2,3,4,4a,5,8,8a - octahydro-1,4,5, 8-dimethano-2,3-naphthalenedicarboxylic anhydride, 5,6, 7,8,9,9-hexabromo-1,2,3,4,4a,5,8,8a - octahydro - 1,4,5,8-dimethano-2,3-naphthalenedicarboxylic acid, 5,6,7,8,9,9-hexabromo-1,2,3,4,4a,5,8,8a-octahydro - 1,4,5,8 - dimethano-2,3-naphthalenedicarboxylic anhydride, 5,6,7,8-tetrachloro-9,9-difluoro-1,2,3,4,4a,5,8,8a - octahydro - 1,4,5,8-dimethano-2,3-naphthalenedicarboxylic acid, 5,6,7,8-tetrachloro-9,9-difluoro-1,2,3,4,4a,5,8,8a - octahydro - 1,4,5,8-dimethano-2,3-naphthalenedicarboxylic anhydride, etc.

The aforementioned halo-substituted polyhydrodialkanonaphthalenedicarboxylic acids and anhydrides thereof may be prepared by condensing a conjugated cycloaliphatic diene with an unsaturated dicarboxylic acid or anhydride thereof in a Diels-Alder type condensation at an elevated temperature in the range of from about 80° to about 250° C. or more and at a pressure sufficient to maintain a major portion of the reactants in the liquid phase, said pressure being in a range of from about atmospheric to about 100 atmospheres or more. In addition, if so desired, the condensation may be effected in an inert organic solvent including aromatics such as benzene, toluene, the xylenes; paraffins, both acyclic and cyclic in nature including pentane, heptane, hexane, cyclopentane, methylcyclopentane, cyclohexane, etc. The resultant bicyclic dicarboxylic acid or anhydride thereof is then further condensed with a halogenated cycloalkadiene, said condensation also being of the Diels-Alder type. This condensation is effected at elevated temperatures in the range of from about 50° to about 250° C., the preferred range being from about 100° to about 200° C. and at atmospheric or superatmospheric pressures ranging up to about 100 atmospheres or more, the pressure again being sufficient so as to maintain a major portion of the reactants in liquid phase at reaction temperature. As in the first condensation, the second condensation may also be effected in the presence of an inert organic solvent of the type hereinbefore set forth. A specific example of the two condensations hereinabove described is the condensation between cyclopentadiene and maleic acid to form norborn-5-ene-2,3-dicarboxylic acid. In the event that maleic anhydride is used, the resultant compound will then be norborn-5-ene-2,3-dicarboxylic anhydride. This compound may then be condensed with hexachlorocyclopentadiene to form 5,6,7,8,9,9-hexachloro-1,2,3,4,4a,5,8,8a - octahydro - 1,4-5,8-dimethano-2,3-naphthalenedicarboxylic acid or anhydride thereof.

The reaction between the halo-substituted polyhydrodialkanonaphthalenedicarboxylic acid or anhydride thereof and the hydroxy-substituted hydrocarbyl compound containing at least one aromatic nucleus is effected at elevated temperatures ranging from about 50° up to about 250° C. and at pressures ranging from about atmospheric up to about 100 atmospheres, the pressure being sufficient to maintain a major portion of the reactants in the liquid phase at the reaction temperature. The reaction is usually effected in the presence of an inert organic solvent, said solvents including aromatic hydrocarbons such as benzene, toluene, o-xylene, m-xylene, p-xylene, ethylbenzene, etc.; paraffinic hydrocarbons, both acyclic and cyclic, such as pentane, hexane, heptane, cyclopentane, methylcyclopentane, etc. When using a solvent of the type hereinbefore set forth, the reaction temperature at which the reaction is effected will depend upon said solvent, the temperature ususally being that of the reflux temperature of the solvent. If the desired product comprises a dihydrocarbyl ester, the reaction is then effected in the presence of an acidic catalyst including organic acids such as methane sulfonic, ethane sulfonic, propane sulfonic, benzene sulfonic, toluene sulfonic, etc. or inorganic acids such as sulfuric acid, hydrochloric acid, etc.

It is also contemplated within the scope of this invention that the desired products may also be prepared by a transesterification reaction starting with a di (lower alkyl) ester of the aforementioned acids. These esters such as dimethyl, diethyl, etc. halo-substituted polyhydrodialkanonaphthalenedicarboxylates are reacted with the desired hydroxy-substituted hydrocarbyl compound containing at least one aromatic nucleus in the presence of an alkali metal alkoxide such as sodium methoxide, potassium methoxide, sodium ethoxide, etc. to form the desired diester of a halo-substituted polyhydrodialkanonaphthalenedicarboxylic acid.

The process of this invention may be effected in any suitable manner and may comprise either a batch or continuous type operation, the preferred method of operation in this particular invention comprising the batch operation. When such a method is used, a quantity of the halo-substituted polyhydrodialkanonaphthalenedicarboxylic acid or anhydride thereof, the hydroxy-substituted hydrocarbyl compound containing at least one aromatic nucleus and solvent, if so desired, are placed in an appropriate apparatus provided with heating and refluxing means. The reaction mixture is then heated to the desired temperature which is usually the reflux temperature of the particular solvent which has been selected for the reaction. The mixture is maintained at this temperature for a predetermined residence time during which the water which is formed is distilled off. At the end of the residence time the apparatus and contents thereof are cooled to room temperature, the solvent is removed and the desired product comprising the monohydrocarbyl ester of the halo-substituted polyhydrodialkanonaphthalenedicarboxylic acid is separated, recrystallized and recovered. As hereinbefore set forth, if a dihydrocarbyl ester of the acid is desired, an acidic catalyst of the type hereinabove set forth is added to the reaction mixture, either at the beginning of the reaction or at an intermediate point during the residence time. Alternatively, the dialkyl ester of the acid may be admixed with the hydroxy-substituted hydrocarbyl compound containing at least one aromatic nucleus in the presence of an alkali alkoxide and the resulting mixture heated to the reaction temperature. The alcohol which has formed is distilled off following which the desired dihydrocarbyl ester of a halo-substituted polyhydrodialkanonaphthalenedicarboxylic acid is recovered by conventional means.

It is also contemplated within the scope of this invention that the process herein may be effected in a continuous manner of operation, although not necessarily with equivalent results. For example, when such an operation is used, the starting materials comprising the halo-substituted polyhydrodialkanonaphthalenedicarboxylic acid or anhydride thereof and the hydroxy-substituted hydrocarbyl compound containing at least one aromatic nucleus are continuously charged to a reaction zone which is maintained at the proper operating conditions of temperature and pressure. The solvent which is utilized during the reaction may also be continuously charged to the reaction zone through a separate line or, if so desired, may be admixed with one or both of the starting materials prior to entry into said reactor and charged thereto in a single stream. Upon completion of the desired residence time, the reactor effluent is continuously withdrawn, the unreacted starting materials are separated by conventional means and recycled to form a portion of the feed stock while the desired reaction product comprising the hydrocarbyl ester of halo-substituted polyhydrodialkanonaphthalenedicarboxylic acid is separated, purified by conventional means and recovered. In the event that a dihydrocarbyl ester is the desired product, the acidic catalyst which is to be used is also continuously charged to the reaction zone in a manner similar to that utilized for the addition of the solvent. Alternatively, the starting materials may comprise a dialkyl ester of the acid and the hydroxy-substituted hydrocarbyl compound. When this is the case, the catalyst will comprise an alkali metal alkoxide of the type hereinbefore set forth instead of an acidic catalyst.

Examples of hydrocarbyl esters of halo-substituted polyhydrodialkanonaphthalenedicarboxylic acids which may be prepared according to the process of this invention include the phenyl ester of 5,6,7,8,9,9-hexachloro-
1,2,3,4,4a,5,8,8a-octahydro-1,4,5,8-dimethano-2,3-naphthalenedicarboxylic acid, the diphenyl ester of 5,6,7,8,9,9-hexachloro-
   1,2,3,4,4a,5,8,8a-octahydro-1,4,5,8-dimethano-2,3-
   naphthalenedicarboxylic acid,
the benzyl ester of 5,6,7,8,9,9-hexachloro-
   1,2,3,4,4a,5,8,8a-octahydro-1,4,5,8-dimethano-2,3-
   naphthalenedicarboxylic acid,
the dibenzyl ester of 5,6,7,8,9,9-hexachloro-
   1,2,3,4,4a,5,8,8a-octahydro-1,4,5,8-dimethano-2,3-
   naphthalenedicarboxylic acid,
the o-cresyl ester of 5,6,7,8,9,9-hexachloro-
   1,2,3,4,4a,5,8,8a-octahydro-1,4,5,8-dimethano-2,3-
   naphthalenedicarboxylic acid,
the di-o-cresyl ester of 5,6,7,8,9,9-hexachloro-
   1,2,3,4,4a,5,8,8a-octahydro-1,4,5,8-dimethano-2,3-
   naphthalenedicarboxylic acid,
the p-ethylphenyl ester of 5,6,7,8,9,9-hexachloro-
   1,2,3,4,4a,5,8,8a-octahydro-1,4,5,8-dimethano-
   2,3-naphthalenedicarboxylic acid,
the di-p-ethylphenyl ester of 5,6,7,8,9,9-hexachloro-
   1,2,3,4,4a,5,8,8a-octahydro-1,4,5,8-dimethano-
   2,3-naphthalenedicarboxylic acid,
the p-methylbenzyl ester of 5,6,7,8,9,9-hexachloro-
   1,2,3,4,4a,5,8,8a-octahydro-1,4,5,8-dimethano-
   2,3-naphthalenedicarboxylic acid,
the di-p-methylbenzyl ester of 5,6,7,8,9,9-hexachloro-
   1,2,3,4,4a,5,8,8a-octahydro-1,4,5,8-dimethano-2,3-
   naphthalenedicarboxylic acid,
the o-chlorophenyl ester of 5,6,7,8,9,9-hexachloro-
   1,2,3,4,4a,5,8,8a-octahydro-1,4,5,8-dimethano-2,3-
   naphthalenedicarboxylic acid,
the di-o-chlorophenyl ester of 5,6,7,8,9,9-hexachloro-
   1,2,3,4,4a,5,8,8a-octahydro-1,4,5,8-dimethano-
   2,3-naphthalenedicarboxylic acid,
the 4-bromo-m-cresyl ester of 5,6,7,8,9,9-hexachloro-
   1,2,3,4,4a,5,8,8a-octahydro-1,4,5,8-dimethano-
   2,3-naphthalenedicarboxylic acid,
the mono- and diisomeric propylphenyl, tert-butylphenyl,
   ethylbenzyl, propylbenzyl, 3,4-dichlorocresyl,
   3,4-dibromocresyl, chlorobenzyl, bromobenzyl esters of
   5,6,7,8,9,9-hexachloro-1,2,3,4,4a,5,8,8a-octahydro-
   1,4,5,8-dimethano-2,3-naphthalenedicarboxylic acid and
   5,6,7,8,9,9-hexabromo-1,2,3,4,4a,5,8,8a-octahydro-
   1,4,5,8-dimethano-2,3-naphthalenedicarboxylic
   acid, etc.

It is to be understood that the aforementioned hydrocarbyl esters are only representatives of the class of compounds which may be prepared and that the present process is not necessarily limited thereto.

It is also contemplated within the scope of this invention that dissimilar esters of the aforementioned polyhalopolyhydrodialkanonaphthalenedicarboxylic acids and anhydrides thereof may be prepared by any method known in the art. An example of the preparation of such an ester would be to react the polyhalopolyhydrodialkanonaphthalenedicarboxylic acid or anhydride thereof with a hydroxy-substituted hydrocarbyl compound containing at least one aromatic nucleus in a solvent, but in the absence of an acidic catalyst. The resultant mono-ester of the acid would then be recovered by separation from unreacted starting materials and reacted with a dissimilar hydroxy-substituted hydrocarbyl compound in the presence of an acidic catalyst to form the desired dissimilar ester. It is to be understood that other means for preparing dissimiliar saturated diesters may also be utilized.

The following examples are given to illustrate the process of the present invention which, however, are not intended to limit the generally broad scope of the present invention in strict accordance therewith.

*Example I*

A mixture of 8.7 grams (0.02 mole) of 5,6,7,8,9,9-hexachloro - 1,2,3,4,4a,5,8,8a - octahydro - 1,4,5,8 - dimethano-2,3-naphthalenedicarboxylic anhydride, 15.1 grams (0.14 mole) of benzyl alcohol, 0.13 gram of methane sulfonic acid and 50 cc. of benzene are placed in a reaction flask provided with a reflux condenser, water trap, heating and stirring means. The flask is heated to reflux temperature (about 80°–85° C.) and maintained thereat for a period of about 15 hours. At the end of this time the flask and contents thereof are allowed to cool to room temperature. The solution is washed with water and a 5% sodium hydroxide and water solution until the extracts are neutral. The mixture is then dried over magnesium sulfate following which the solvent and excess alcohol are removed by distillation under a reduced pressure. The residue is the dibenzyl ester of 5,6,7,8,9,9-hexachloro-1,2,3,4,4a,5,8,8a - octahydro - 1,4,5,8 - dimethano - 2,3-naphthalenedicarboxylic acid.

*Example II*

In this example 9.4 grams (0.02 mole) of dimethyl 5,6,7,8,9,9 - hexachloro - 1,2,3,4,4a,5,8,8a - octahydro-1,4,5,8 - dimethano-2,3 - naphthalenedicarboxylate, 12.2 grams (0.10 mole) of phenylethyl alcohol and 0.13 gram of sodium methoxide are placed in an apparatus similar to that hereinbefore set forth in Example I above. The mixture is refluxed for a period of about 2 hours. At the end of this time the flask is arranged for fractional distillation and methanol distilled. This is continued until the vapor temperature reaches 110° C. The flask is cooled, the contents diluted with 50 cc. of benzene and thereafter washed with water, until the extracts are neutral. The solution is then dried over magnesium sulfate following which the solvent is removed by fractional distillation under reduced pressure. The residue is the diphenylethyl ester of 5,6,7,8,9,9-hexachloro-1,2,3,4,4a,5,8,8a-octahydro-1,4,5,8-dimethano-2,3-naphthalenedicarboxylic acid.

*Example III*

In this example a mixture of 9.4 grams (0.02 mole) of dimethyl 5,6,7,8,9,9 - hexachloro - 1,2,3,4,4a,5,8,8a-octahydro - 1,4,5,8 - dimethano - 2,3 - naphthalenedicarboxylate, 15.1 grams (0.14 mole) of p-cresol and 0.13 gram of sodium methoxide are refluxed in a reaction vessel for a period of about 2 hours. At the end of this time the flask is arranged for fractional distillation. The methanol is distilled off while heating is continued until the vapor temperature reaches 110° C. The flask is then cooled to room temperature and 50 cc. of benzene are added. Following this, the solution is washed with water until the extracts are neutral. The solvent is removed by fractional distillation under reduced pressure. The residue comprises the di-p-cresyl ester of 5,6,7,8,9,9-hexachloro - 1,2,3,4,4a,5,8,8a - octahydro - 1,4,5,8 - dimethano-2,3-naphthalenedicarboxylic acid.

*Example IV*

A mixture of 9.4 grams (0.02 mole) of dimethyl 5,6,7,8,9,9 - hexachloro -1,2,3,4,4a,5,8,8a - octahydro - 1,4,5,8-dimethano - 2,3 - naphthalenedicarboxylate 15.0 grams (0.10 mole) of p-tert-butylphenol and 0.13 gram of sodium methoxide is placed in a reaction flask provided with a reflux condenser, water trap, heating and stirring means. The flask is heated to reflux temperatures and maintained thereat for a period of about 2 hours. At the end of this time the flask is prepared for fractional distillation and the methanol which has formed is distilled off. The distillation is continued until the vapor temperature reaches approximately 110° C. The flask and contents thereof are cooled, 50 cc. of benzene are added and the solution is washed with water until the extracts are neutral. The mixture is then dried over magnesium sulfate following which the solvent is removed by distillation under reduced pressure. The residue comprises the di-p-tert-butylphenyl ester of 5,6,7,8,9,9 - hexachloro - 1,2,3,4,4a,5,8,8a - octahydro - 1,4,5,8 - dimethano - 2,3 - naphthalenedicarboxylic acid.

Example V

In this example 9.1 grams (0.02 mole) of 5,6,7,8,9,9-hexachloro - 1,2,3,4,4a,5,8,8a - octahydro - 1,4,5,8 - dimethano - 2,3 - naphthalenedicarboxylic acid, 17.8 grams (0.10 mole) of p-isopropylphenylacetate and 0.13 gram of toluenesulfonic acid are placed in an apparatus similar to that described in Example I above. The mixture is then refluxed for a period of about 2 hours. At the end of this time the flask is prepared for fractional distillation. The acetic acid is distilled out. The flask and contents thereof are allowed to cool and 50 cc. of benzene are added. Following this, the solution is washed with water, sodium hydroxide and water until the extracts are neutral. The solution is then dried over magnesium sulfide and the solvent is removed by fractional distillation under reduced pressure. The residue comprises the di-p-isopropylphenol ester of 5,6,7,8,9,9 - hexachloro - 1,2,3,4,4a,5,8,8a - octahydro - 1,4,5,8 -dimethano - 2,3 - naphthalenedicarboxylic acid.

Example VI

In this example a mixture of 9.4 grams (0.02 mole) of dimethyl 5,6,7,8,9,9 - hexachloro - 1,2,3,4,4a,5,8,8a - octahydro - 1,4,5,8 - dimethano - 2,3 - naphthalenedicarboxylate, 17.7 grams (0.10 mole) of 3,4-dichloro-o-cresol and 0.13 gram of sodium methoxide is placed in a reaction flask provided with a reflux condenser, water trap, heating and stirring means. The flask is heated to reflux temperature and maintained thereat for a period of about 2 hours. At the end of this time the flask is arranged for fractional distillation and the methanol formed during the transesterification is removed. Distillation is continued until the vapor temperature reaches 110° C. The flask and contents thereof are cooled and 50 cc. of benzene is added. Thereafter the solution is washed with water until the extracts are neutral. The mixture is dried and the solvent is removed by distillation under reduced pressure. The residue comprises the di(3,4-dichloro-o-cresyl) ester of 5,6,7,8,9,9 - hexachloro - 1,2,3,4,4a,5,8,8a - octahydro - 1,4,5,8-dimethano-2,3-naphthalenedicarboxylic acid.

Example VII

In this example a dibenzyl ester of 5,6,7,8,9,9-hexachloro - 1,2,3,4,4a,5,8,8a - octahydro - 1,4,5,8 - dimethano-2,3-naphthalenedicarboxylic acid and polyvinyl chloride are admixed in a beaker, the ester being present in an amount of about 50 parts by weight of ester per 100 parts of resin. After slowly admixing in the beaker, the mixture is milled on a milling machine at a temperature of about 260° F. for a period of 7 minutes, the batches then being sheeted off. The sheets are molded in a standard rubber mold by heating the mold at a temperature of about 300° F. and placing the sample in the mold. The press is closed without pressure for a period of about 10 minutes following which a pressure of about 4,000 pounds per square inch is applied for an additional 10 minutes. The samples are then allowed to cool under this pressure before removal from the mold.

In addition, other resinous polymers are prepared by admixing polyvinyl acetate with a dibenzyl ester of 5,6,7,8,9,9 - hexachloro - 1,2,3,4,4a,5,8,8a - octahydro - 1,4,5,8-dimethano - 2,3 - naphthalenedicarboxylic acid and treating the admixture in a manner similar to that set forth in the above paragraph. The resulting polymers will be translucent in nature with no signs of tackiness or plasticizer incompatibility.

I claim as my invention:

1. An ester of a halo-substituted octahydro-1,4,5,8-dimethano-2,3-naphthalenedicarboxylic acid and a hydroxy-substituted compound of the formula:

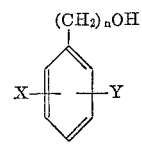

wherein X and Y are independently selected from the group consisting of hydrogen, halogen and lower alkyl and $n$ is a number of from 0 to 4.

2. An ester of 5,6,7,8,9,9 - hexachloro - 1,2,3,4,4a,5,8,8a - octahydro - 1,4,5,8 - dimethano - 2,3 - naphthalenedicarboxylic acid and a hydroxy-substituted compound of the formula:

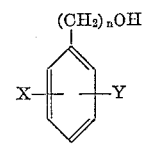

wherein X and Y are independently selected from the group consisting of hydrogen, halogen and lower alkyl and $n$ is a number of from 0 to 4.

3. The benzyl ester of 5,6,7,8,9,9-hexachloro-1,2,3,4,4a,5,8,8a - octahydro - 1,4,5,8 - dimethano - 2,3 - naphthalenedicarboxylic acid.

4. The phenylethyl ester of 5,6,7,8,9,9-hexachloro-1,2,3,4,4a,5,8,8a - octahydro - 1,4,5,8 - dimethano - 2,3 - naphthalenedicarboxylic acid.

5. The p-cresyl ester of 5,6,7,8,9,9-hexachloro-1,2,3,4,4a,5,8,8a - octahydro - 1,4,5,8 - dimethano - 2,3 - naphthalenedicarboxylic acid.

6. The p - tert - butylphenyl ester of 5,6,7,8,9,9 - hexachloro - 1,2,3,4,4a,5,8,8a - octahydro - 1,4,5,8 - dimethano-2,3-naphthalenedicarboxylic acid.

7. The p - isopropylphenyl ester of 5,6,7,8,9,9 - hexachloro - 1,2,3,4,4a,5,8,8a - octahydro - 1,4,5,8 - dimethano-2,3-naphthalenedicarboxylic acid.

References Cited

UNITED STATES PATENTS

| | | | |
|---|---|---|---|
| 2,635,977 | 4/1953 | Lidov | 260—468 X |
| 3,288,813 | 11/1966 | Kleiman | 260—513 X |

OTHER REFERENCES

Riemschneider et al.: "Monatshefte fur Chemie," vol. 91, (1960).

LORRAINE A. WEINBERGER, *Primary Examiner.*

T. GALLOWAY, *Assistant Examiner.*